S. E. DOWDEN.
POWER TRANSMISSION BELT.
APPLICATION FILED MAR. 23, 1918.
1,302,330.
Patented Apr. 29, 1919.
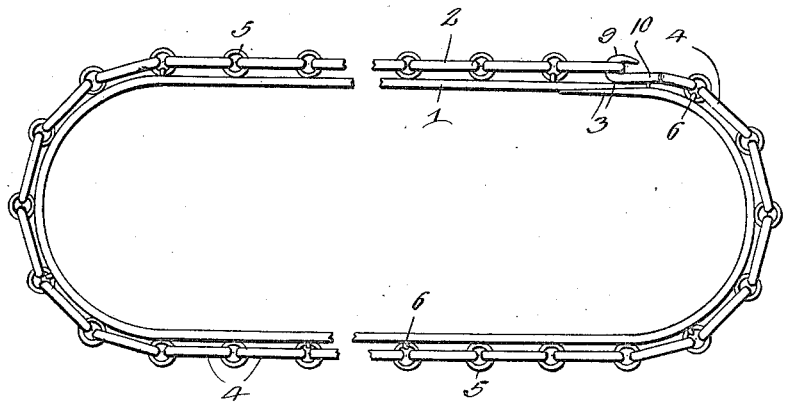
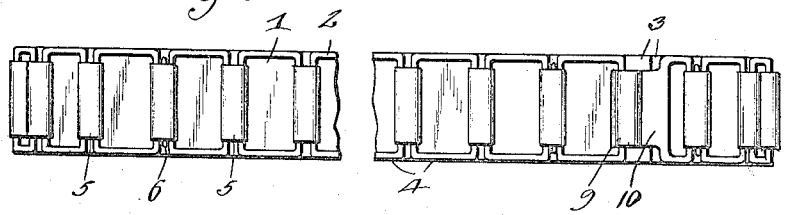
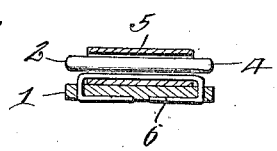
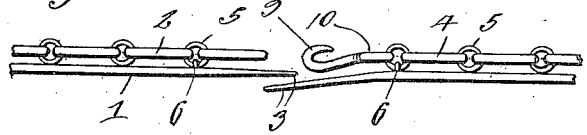
WITNESSES
INVENTOR
S. E. Dowden,
BY Victor J. Evans
ATTORNEY

UNITED STATES PATENT OFFICE.

SAMUEL E. DOWDEN, OF CHELSEA, OKLAHOMA.

POWER-TRANSMISSION BELT.

1,302,330.

Specification of Letters Patent.   Patented Apr. 29, 1919.

Application filed March 23, 1918.   Serial No. 224,108.

*To all whom it may concern:*

Be it known that I, SAMUEL E. DOWDEN, a citizen of the United States, residing at Chelsea, in the county of Rogers and State of Oklahoma, have invented new and useful Improvements in Power-Transmission Belts, of which the following is a specification.

This invention relates to improvements in power transmission belts, such as used on pulleys and it is especially adapted for use in driving the fan on an automobile, the object of the invention being to provide an improved belt of this character which is extremely strong and durable, which will not stretch or slip, and which can be readily placed on or removed from the pulley.

With the above and other objects in view the invention consists in the construction, combination and arrangement of devices hereinafter described and claimed.

In the accompanying drawing:—

Figure 1 is an elevation of a power transmission belt constructed and arranged in accordance with my invention.

Fig. 2 is a plan of the same.

Fig. 3 is a transverse sectional view of the same.

Fig. 4 is a detailed elevation showing the ends of the belt separated.

In the embodiment of my invention I provide an inner belt 1, which is preferably made of leather, and a chain 2 which is arranged on the outer side of the inner belt. The inner belt is open, its ends 3 being disconnected. The chain comprises links 4 and roller links 5 which connect the links 4 together. At suitable points in the length of the chain, staples 6 are employed to secure certain of the roller links to the inner belt, the said staples extending through said roller links and their ends being clenched in the belt, as shown. The end links of the chain which are coincident with the ends of the inner belt are detachably connected together by a hook 9 which has an eye shank 10.

The length of the inner belt somewhat exceeds that of the chain, so that when the belt is arranged for use, the ends of the inner belt overlap, as shown in detail in Fig. 4, and the open roller links of the chain which connect the ends of the chain together bear on the outer overlapping ends of the inner belt.

My improved belt is extremely strong and durable, is not liable to stretch, is enabled to withstand a high degree of heat without injury, will not slip on the pulleys, and may be readily attached, detached, and adjusted.

While I have herein shown and described a preferred form of my invention, I would have it understood that changes may be made in the form, proportion and construction of the several parts without departing from the spirit of my invention, and within the scope of what is claimed.

Having thus described my invention I claim:—

1. A power transmission belt of the class described comprising an open inner belt having its ends arranged in overlapping relation, a chain on the outer side of the inner belt, and means to secure the ends of the chain detachably together, the ends of the chain being substantially coincident with those of the belt, and certain of the links of the chain being attached to the belt to prevent the removal of the chain therefrom.

2. A power transmission belt of the class described comprising an inner belt, a chain on the outer side of the inner belt, said chain comprising substantially rectangular links and roller links which connect the first named links together, and staples extending through certain of the roller links and having their ends bent in the belt, to secure the belt and the chain together.

In testimony whereof I affix my signature.

SAMUEL E. DOWDEN.